United States Patent
Case (10) Patent No.: US 10,602,075 B2
(45) Date of Patent: Mar. 24, 2020

(54) AUTOMATICALLY DETERMINING A SET OF EXPOSURE VALUES FOR A HIGH DYNAMIC RANGE IMAGE CAPTURE DEVICE

(71) Applicant: Adobe Inc., San Jose, CA (US)

(72) Inventor: Richard Case, Hamburg (DE)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/702,014

(22) Filed: Sep. 12, 2017

(65) Prior Publication Data
US 2019/0082091 A1    Mar. 14, 2019

(51) Int. Cl.
*H04N 5/235* (2006.01)
*H04N 5/265* (2006.01)

(52) U.S. Cl.
CPC ......... *H04N 5/2355* (2013.01); *H04N 5/2356* (2013.01); *H04N 5/265* (2013.01)

(58) Field of Classification Search
CPC ..... H04N 5/2355; H04N 5/2356; H04N 5/265
USPC ................. 348/223.1, 221.1, 229.1
See application file for complete search history.

(56) References Cited

U.S. PATENT DOCUMENTS

| | | | | |
|---|---|---|---|---|
| 8,582,001 B2* | 11/2013 | Tzur | .................... | H04N 5/3355 348/229.1 |
| 2009/0102945 A1* | 4/2009 | Chen | .................... | H04N 5/2351 348/229.1 |
| 2011/0090361 A1* | 4/2011 | Kobayashi | ......... | H04N 5/35554 348/222.1 |
| 2013/0235232 A1* | 9/2013 | Yang | .................... | H04N 5/2353 348/229.1 |
| 2014/0307117 A1* | 10/2014 | Feng | .................... | H04N 5/2355 348/218.1 |

(Continued)

OTHER PUBLICATIONS

Hasinoff, Samuel W., et al., "Noise-Optional Capture for High Dynamic Range Photography", In IEEE Conference on Computer Vision and Pattern Recognition, Jun. 2010, 9 pages.

(Continued)

*Primary Examiner* — Sinh Tran
*Assistant Examiner* — Zhenzhen Wu
(74) *Attorney, Agent, or Firm* — Kilpatrick Townsend & Stockton LLP (57) ABSTRACT

In some embodiments, an image capture device receives a capture command to capture an image. Exposure adjustment operations are subsequently performed. These operations include determining that a first luminance indicated by first image data, which is obtained using a first exposure value, exceeds a threshold luminance. The operations also include decreasing, based on the threshold luminance being exceeded, the first exposure value to a second exposure value. The operations also include determining, from second image data obtained using the second exposure value, that a second luminance indicated by the second image data is less than the threshold luminance. The HDR setting of the image capture device is configured to include a bracket of exposure values, where the second exposure value is a minimum exposure value from the bracket of exposure values. The image capture device executes a capture operation in which an image bracket is captured using this HDR setting.

18 Claims, 4 Drawing Sheets
(1 of 4 Drawing Sheet(s) Filed in Color)

(56) References Cited

U.S. PATENT DOCUMENTS

| | | | |
|---|---|---|---|
| 2014/0307129 A1* | 10/2014 | Feng | H04N 5/2173 348/242 |
| 2015/0350512 A1* | 12/2015 | Chen | H04N 5/2355 348/222.1 |
| 2017/0026594 A1* | 1/2017 | Shida | H04N 5/2355 |
| 2017/0094145 A1* | 3/2017 | Miketa | H04N 5/23229 |
| 2017/0171446 A1* | 6/2017 | Nashizawa | G06T 5/007 |
| 2017/0278546 A1* | 9/2017 | Xiao | G11B 27/031 |
| 2017/0332060 A1* | 11/2017 | Chan | H04N 9/646 |
| 2018/0041682 A1* | 2/2018 | Zhang | H04N 5/2355 |

OTHER PUBLICATIONS

Guthier, Benjamin, et al., "Optimal Shutter Speed Sequences for Real-Time HDR Video", Imaging Systems and Techniques (IST), IEEE International Conference, Jul. 2012, 11 pages.

Guthier, Benjamin, et al., "Determining Exposure Values form HDR Histograms for Smartphone Photography", MM '13 Proceedings of the 21st ACM International Conference on Multimedia, Oct. 2013, 3 pages.

\* cited by examiner

AUTOMATICALLY DETERMINING A SET OF EXPOSURE VALUES FOR A HIGH DYNAMIC RANGE IMAGE CAPTURE DEVICE

TECHNICAL FIELD

This disclosure relates generally to systems and methods for configuring camera devices to capture or otherwise generate images. More specifically, but not by way of limitation, this disclosure relates to automatically configuring an image capture device with a set of exposure values for high dynamic range imaging or other applications requiring multiple exposure values.

BACKGROUND

Variations in lighting impact the quality of images captured by cameras. For example, normal objects in sunlight and in a shadow often differ in brightness by a factor of 10,000 or more. Objects deep in a room, seen through a small window from outside, can be very dark compared to the outside wall of the house illuminated by direct sunlight. Cameras use adjustable dynamic ranges to account for these differences, where a photographer chooses the range of radiance values of interest and selects the exposure time to optimally capture colors in that range.

To capture the dynamic range in a scene with variations in lighting, a photographer can use high dynamic range ("HDR") imaging. HDR imaging allows a greater dynamic range of luminance between light and dark areas of a scene than conventional imaging techniques. HDR images are generated by capturing multiple images at different exposures (e.g., using different F-stops, ISO values, and/or shutter speeds) with a conventional camera, and then combining the image data from the multiple images into a single HDR image.

However, the different exposures used to capture a dynamic range image could fail to account for variations in lighting in all areas of a scene, particularly if different light sources or shadows in an area result in a wide range of lighting conditions. A user could capture multiple images and then manually analyze the images at a later time to assess the exposure values used for HDR imaging and thereby select a set of appropriate exposure values. But this cumbersome solution reduces the ability of a photographer to quickly identify and capture an interesting scene in real time (i.e., when the photographer actually uses the camera to capture an image). For these and other reasons, existing HDR processes present disadvantages.

SUMMARY

Certain embodiments involve automatically configuring an image capture device with a set of exposure values. For example, an image capture device receives a capture command to capture an image (e.g., by capturing a bracket of images for high dynamic range ("HDR") processing). Subsequent to receiving the capture command, exposure adjustment operations are performed. These exposure adjustment operations include determining, from first image data, a first luminance indicated by the first image data is greater than or equal to a threshold luminance. The first image data is obtained using the image capture device configured with a first exposure value. The exposure adjustment operations also include decreasing, based on the first luminance exceeding the threshold luminance, the first exposure value of the image capture device to a second exposure value. The exposure adjustment operations also include determining, from second image data, that a second luminance indicated by the second image data is less than the threshold luminance. The second image data is obtained using the image capture device configured with the second exposure value. The exposure adjustment operations also include configuring the HDR setting of the image capture device to include a bracket of exposure values in which the second exposure value is a minimum exposure value from the bracket of exposure values. The image capture device responds to the capture command by executing a capture operation using this HDR setting.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Certain embodiments involve automatically configuring an image capture device with a set of exposure values. For example, processing logic in an image capture device (e.g., a stand-alone digital camera, a smartphone, etc.) automatically identifies a particular exposure value by iteratively modifying the image capture device's exposure value setting until no objects in a scene are overexposed within an image of the scene. The processing logic selects the identified exposure value as the minimum exposure value for a bracket of exposure values. The iterative process for finding this minimum exposure value (as well as other exposure values for the bracket) is performed between receipt of a user input initiating a high dynamic range ("HDR") image capture operation and the actual performance of the HDR image capture operation. In this manner, the image capture device determines, at the time of image capture, an optimal set of exposure values that account for lighting variations in a particular scene, thereby improving the resulting HDR image.

The follow non-limiting example is intended to introduce certain embodiments. In this example, an image capture device receives a capture command, such as a "button press" input on an interface displayed on a touchscreen, for causing the image capture device to capture an HDR image of a scene. The capture command causes an exposure adjustment module, which is executed by processing circuitry in the image capture device, to perform a set of exposure adjustment operations prior to performing the HDR image capture. These exposure adjustment operations involve iteratively modifying a "test" exposure value until a minimum exposure value is identified, where an image captured using the minimum exposure value does not include any overexposed image portions (e.g., pixels or groups of pixels), or at least includes a threshold number of image portions (i.e., pixels or groups of pixels) that are not overexposed. In one iteration, the exposure adjustment module accesses image data that is obtained using a particular exposure value. The accessed image data could be, for example, transient image data that is a lower-resolution version of raw image data from an image sensor. For instance, the exposure adjustment module could use lower-quality image data displayed in a preview interface for aiming the image capture device, which facilitates the iterative process being performed in real time (e.g., a time period of less than a second, or another time period that is virtually imperceptible to a user). The exposure adjustment module identifies luminance values for various pixels in the accessed image data. The exposure adjustment module determines whether the pixels luminance values are greater than or equal to a threshold luminance value (e.g., a luminance value of 1, where the luminance values range from 0 to 1). This determination indicates whether the image data includes any overexposed regions (i.e., regions with pixels having the threshold luminance value) or at least a threshold number of overexposed regions or overexposed pixels.

Continuing with this example, if the pixels are overexposed, the exposure adjustment module decreases the exposure value and performs another iteration of comparing the luminance values for resulting image data to the threshold luminance value. The exposure adjustment module continues this iterative process until an exposure value is found that results in image data without any overexposed image regions. This exposure value is used as the minimum exposure value in a bracket of exposure values, which can be determined in any suitable manner (e.g., as multiple of or increments from the minimum exposure value). The image capture device then performs the HDR image capture with the computed bracket of exposure values.

Certain embodiments facilitate an automatic, real-time determination of a suitable bracket of exposure values for a particular scene. For instance, an exposure adjustment module described herein can quickly compute a bracket of exposure values following an input triggering an HDR capture and before an actual performance of the HDR capture (i.e., in real time). In some embodiments, using raw image data or transient image data (e.g., "preview" image data) provides the exposure adjustment module with a readily accessible set of test image data used for real-time computation of the bracket of exposure values to be used in an HDR capture. These embodiments reduce the need to perform a cumbersome process of performing HDR image captures, analyzing the resulting HDR images, and then manually updating how exposure values are performed for future HDR image captures. Furthermore, these embodiments allow the exposure bracket to be computed while a camera is aimed at a scene of interest.

As used herein, the term "image capture device" refers to a camera or other imaging device that is capable of capturing a photographic or video image. Examples of an image capture device include specialized devices (e.g., devices with no general functions other than taking pictures) and multipurpose devices (e.g., devices such as smart phones that are capable of performing functions besides taking pictures). Examples of image capture devices include, but are not limited to, still-image image capture devices, video image capture devices, smartphones, tablet computing devices, webcams, security image capture devices, and other devices capable of capturing still images or motion footage.

As used herein, the term "capturing" or comparable phrases refers to the act of storing image data that has been obtained from sensors of an image capture device (e.g., by storing raw image data read from image sensors or a processed version of the raw image data). In some embodiments, multiple images are captured by a same image capture device at a same time, or substantially the same time, and the captured picture is based on more than one of the multiple images. The multiple images have exposure value, settings, or other differences in the image capture device's actions. The embodiments described herein can be readily applied to situations in which multiple images of different exposure values are being used.

As used herein, the terms "image," "picture," and "photograph" refer to a media item including visual content captured with an image capture device. Unless otherwise indicated, an image can be generated based on multiple digital images.

As used herein, the term "digital image" refers to an electronic representation of photographic subject matter, such as by set of pixels. A digital image is of any suitable format, such as a bitmap or a JPEG file format. For convenience, digital images are referred to herein as having settings. Unless otherwise indicated, this refers to digital images taken by image capture devices having the setting (e.g., a digital image taken by an image capture device having a high ISO setting). In some cases, digital images are received from an image capture device in response to a single user action, such as the action of taking a picture. Additionally or alternatively, digital images are received from a series of related images, such as video data.

As used herein, the terms "photographic content" and "content" refer to the subject matter of a picture or a digital image, unless otherwise indicated. It is to be understood that similar subject matter may have various appearances (or non-appearance) in various digital images.

Figure 1:
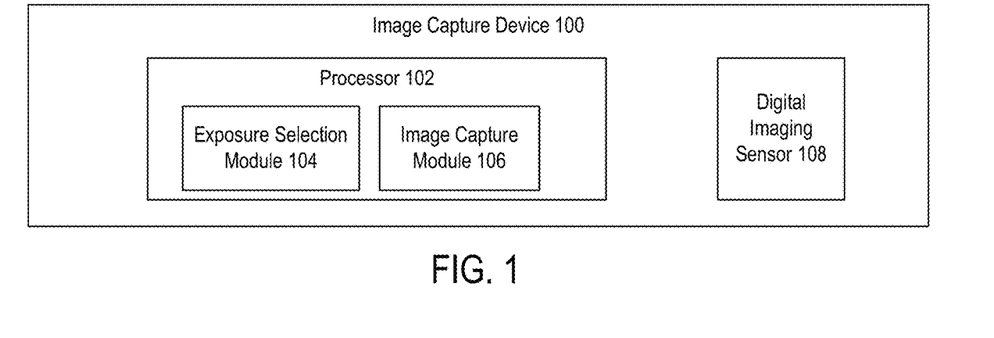
FIG. 1 depicts an example of an image capture device that is automatically configured for selecting a set of useful exposure values, according to certain embodiments of the present disclosure.

Referring now to the drawings, FIG. 1 depicts an example of an image capture device 100 that is automatically configured for selecting a set of exposure values used in HDR imaging. Examples of the image capture device 100 include a smartphone, a digital camera, a tablet computer, a laptop computer, or any other computing device capable of digitally capturing an observed scene. A combination of different devices may be used in certain embodiments. In general, the various embodiments disclosed herein can be implemented in conjunction with a wide range of existing or subsequently developed hardware capable of capturing and displaying digital images.

The image capture device 100 includes one or more processors 102 and one or more digital image sensors 108. The processor 102 executes an exposure selection module 104 and an image capture module 106. The image capture module 106 includes program instructions that, when executed by the processor 102, configure the processor 102 to capture one or more digital images by sampling, processing, storing, or otherwise using sensor data obtained from the digital image sensor 108. The exposure selection module 104 includes program instructions that, when executed by the processor 102, configure the processor 102 to compute a set of exposure values that are to be used by the image capture module 106 when capturing HDR images or other digital images that use multiple exposure values.

Figure 2:
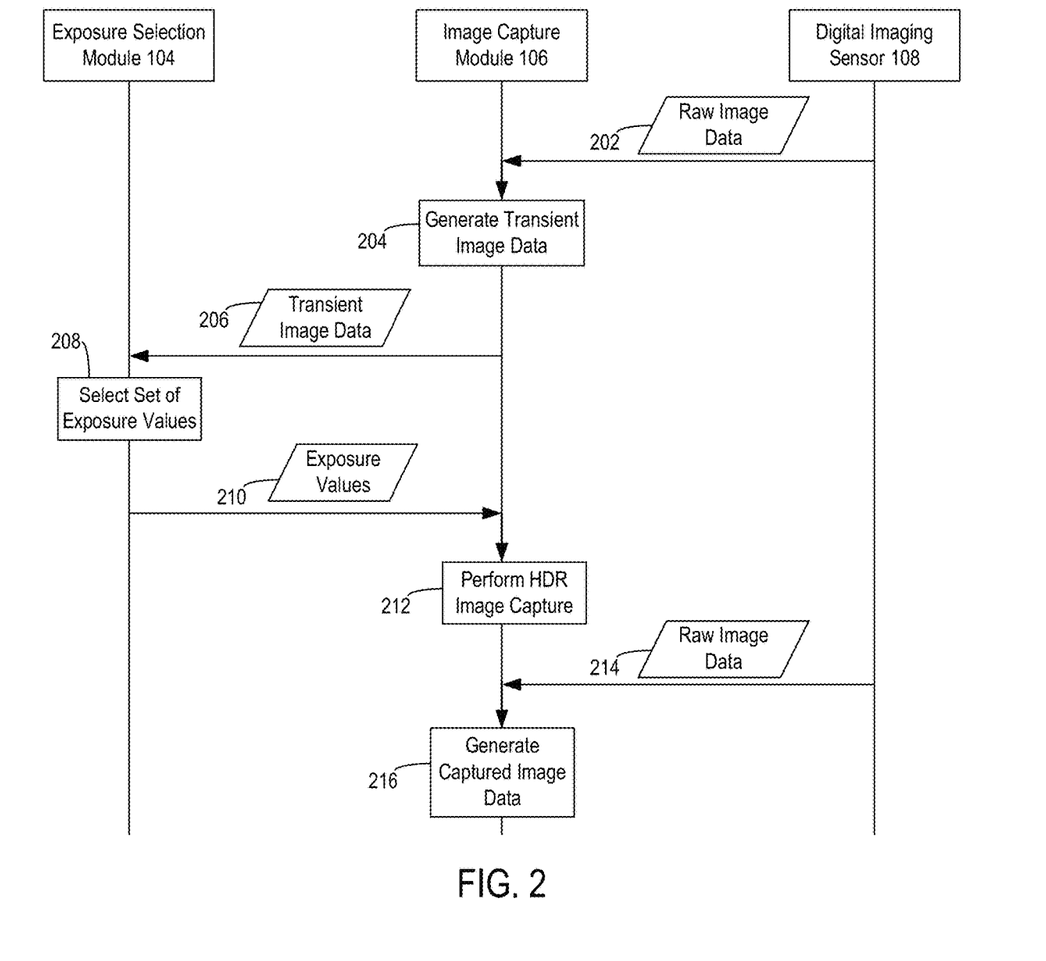
FIG. 2 depicts an example of interactions among an exposure selection module, an image capture module, and a digital imaging sensor for selecting a set of useful exposure values, according to certain embodiments of the present disclosure.

FIG. 2 depicts an example of interactions among the exposure selection module 104, the image capture module 106, and the digital imaging sensor 108 for selecting a set of useful exposure values, according to certain embodiments of the present disclosure.

In this example, the digital imaging sensor 108 provides raw image data 202 to the image capture module 106. The raw image data 202 includes unprocessed (or minimally processed) data generated by the digital imaging sensor 108 in response to a light stimulus. For instance, the image capture module 106 obtains raw image data 202 that is full-resolution sensor data read from image sensor pixels of the digital imaging sensor 108.

In some embodiments, the image capture module 106 performs an operation 204 for generating transient image data 206 and provides the image data 206 to the exposure selection module 104, as depicted in FIG. 2. In some embodiments, the operation 204 involves converting the obtained raw image data 202 into a low-resolution version of the raw image data 202 (e.g., by rendering and downsampling the raw image data 202). The transient image data 206 is this low-resolution version of the raw image data 202. The transient image data 206 is stored in a volatile memory of the image capture device 100. For instance, the image capture device 100 can present the transient image data 206 on a display device of the image capture device. The displayed transient image data 206 is used as a preview (similar to a viewfinder in non-digital cameras) that assists a user in aiming the image capture device 100 at the scene to be imaged. The exposure selection module 104 can access the transient image data 206 from the volatile memory.

The exposure selection module 104 executes an algorithm 208 for computing a set of exposure values to be used by the image capture device 100 in an HDR image capture. In some embodiments, after an HDR capture has been initiated, the exposure selection module 104 causes the image capture device 100 to use iteratively decreased exposure values and obtain transient image data 206 for each exposure value. The iteration is based on the exposure selection module 104 identifying an exposure value for which the luminance, which is described in greater detail with respect to FIG. 3, in the transient image data 206 is less than "1," or some other luminance indicating overexposure. The set of exposure values is generated based on this identified exposure value. A detailed example of the algorithm 208 is described below with respect to FIG. 3.

The exposure selection module 104 provides the set of exposure values 210 to the image capture module 106. The image capture module 106 uses the set of exposure values 210 to perform an HDR image capture 212. The HDR image capture 212 involves obtaining additional raw image data 214 (e.g. a bracket of image captures using different exposure values) and performing an operation 216 for generating captured image data from the raw image data 214. The image capture module 106 stores the captured image data in a non-volatile memory of the image capture device 100. In some embodiments, the operation 216 includes combining the different sets of raw image data 214 into an HDR image having the same resolution and format as the raw image data 214. In additional or alternative embodiments, the operation 216 includes combining the different sets of raw image data 214 into an HDR image having a different resolution, a different format, or both as compared to the raw image data 214. For instance, an HDR capture operation could include accessing frames from raw image data in a volatile memory device, converting the accessed frames to a compressed image format, and storing, in a non-volatile memory device, a combined image generated from the compressed frames (i.e., the HDR image).

Although FIG. 2 depicts an example in which transient image data 206 is provided to the exposure selection module 104, other implementations are possible. In some embodiments, raw image data 206 can be stored in volatile memory for use by the exposure selection module at algorithm 208.

Figure 3:
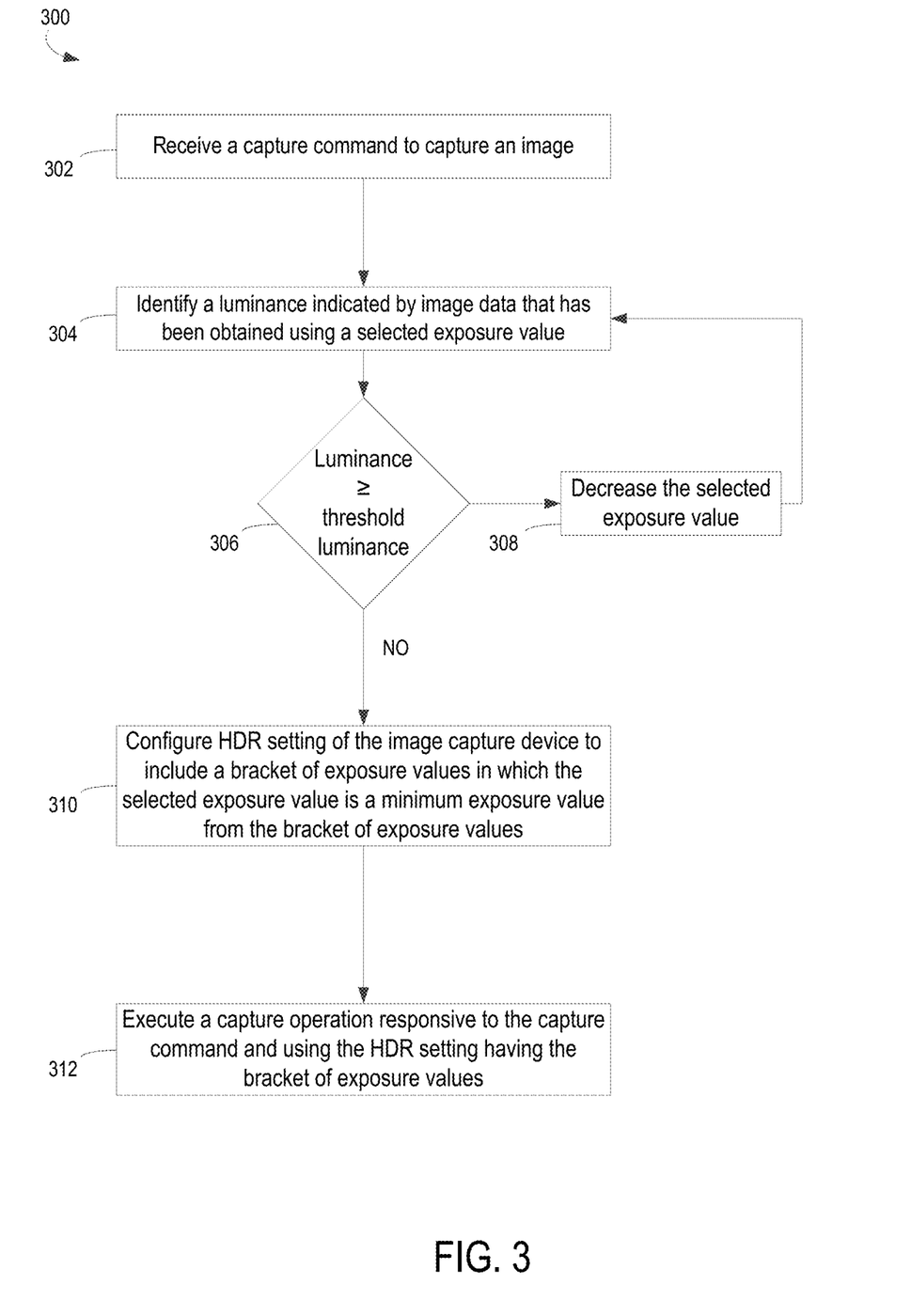
FIG. 3 depicts an example of a process performed by the image capture device of FIG. 1 for automatically configuring an image capture device with a set of exposure values, according to certain embodiments of the present disclosure.

FIG. 3 depicts an example of a process 300, which may be performed by the image capture device 100 or another suitable computing system, for automatically configuring an image capture device with a set of exposure values. The process 300 is described with respect to the examples depicted in FIGS. 1 and 2. For instance, blocks 304, 306, 308, and 310 can be used to implement the algorithm 208 for selecting a set of exposure values. But other implementations are possible.

In some embodiments, one or more processors 102 implement operations depicted in FIG. 3 by executing suitable program code (e.g., the exposure selection module 104 and the image capture module 106). For illustrative purposes, the process 300 is described with reference to certain examples depicted in the figures. Other implementations, however, are possible.

Figure 4:
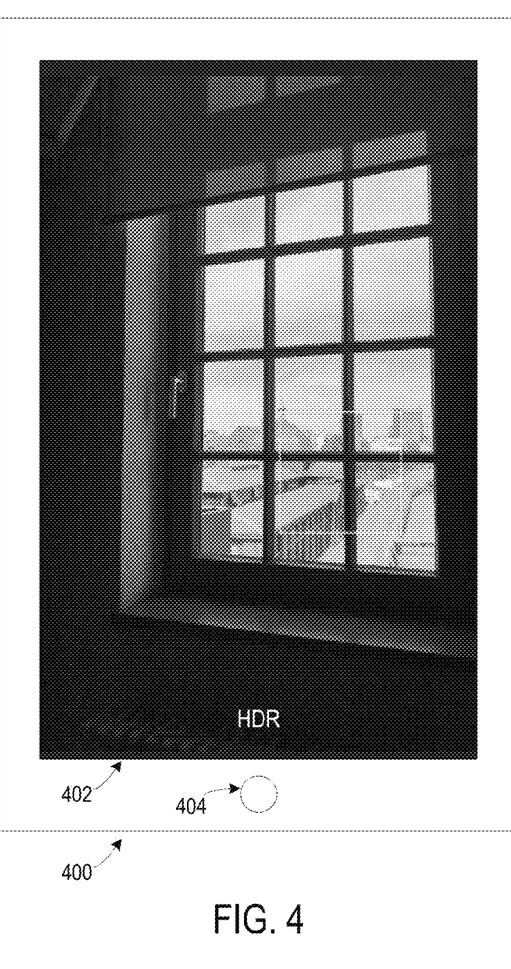
FIG. 4 depicts an example of an interface used by the image capture device of FIG. 1 to capture an image in a high dynamic range ("HDR") mode, according to certain embodiments of the present disclosure.

At block 302, the process 300 involves receiving a capture command to capture an image (e.g., a command to capture a bracket of images for HDR processing into an HDR image). For instance, the image capture device 100 receives input from a user that includes, selects, or otherwise indicates the capture command. The image capture device 100 receives the input via a button, a touchscreen, or other input device that is included in or communicatively coupled to the image capture device 100. For instance, FIG. 4 depicts an example of an interface 400 used by the image capture device 100 to capture an image in an HDR mode. The interface 400 is displayed, for example, on a touchscreen of a smartphone or other image capture device. The interface 400 includes a preview 402, which can include transient image data generated from the digital image sensor 108. The interface 400 also includes a button element 404, which can receive a touch input. Receiving the touch input at the button element 404 causes a captured command to be provided to the image capture module 106.

Returning to FIG. 3, the process 300 further involves performing a set of exposure adjustment operations subsequent to receiving the capture command. These exposure adjustment operations involve one or more of the operations associated with blocks 304, 306, 308, and 310. In some embodiments, the exposure adjustment operations are completed prior to executing a capture operation that is triggered by the capture command received at block 302.

At block 304, the process involves identifying a luminance indicated by image data that has been obtained using a selected exposure value. For instance, the image capture device 100 is configured with a first exposure value and obtains a first set of image data using the first exposure value. In some embodiments, obtaining this image data involves storing the image data as transient image data in a volatile memory of the image capture device 100. In one example, the image capture device 100 samples raw image data 202 from the digital imaging sensor 108 or otherwise creates a lower-resolution version of the raw image data 202 from the digital imaging sensor 108. This transient image data could be displayed in the preview 402 depicted in FIG. 4.

In additional or alternative embodiments, obtaining this image data involves storing the raw image data 202 in a volatile memory of the image capture device 100. For example, the processor 102 accesses raw image data generated by the digital imaging sensor 108. The processor selects a frame of the raw image data as the image data used at block 304.

The exposure selection module 104 is executed by one or more processing devices of the image capture device 100 and thereby identifies one or more luminance values in the obtained image data. In one example, the exposure selection module 104 accesses the obtained image data (e.g., a frame from raw image data, a transient image, etc.) from the volatile memory device. The exposure selection module 104 uses the access image data to identify, for all pixels in the obtained image data or a representative subset of pixels in the obtained image data, respective luminance values in the image data.

At block 306, the process 300 further involves determining whether the identified luminance is greater than or equal to a threshold luminance. For instance, the exposure selection module 104 accesses the threshold luminance from a memory of the image capture device (e.g., a non-volatile memory that stores the exposure selection module 104 or a volatile memory that stores the transient image data). The threshold luminance has a value indicating overexposure of image data. In some embodiments, the threshold luminance value is "1." In other embodiments, a different threshold luminance value could be used. The threshold luminance can be a fixed value, a default value, a user-entered value.

The exposure selection module 104 examines the image data and compares one or more or more luminance values, as identified in block 304, to the threshold luminance value. The exposure selection module 104 determines, based on this comparison, that one or more portions of the image data are overexposed. The exposure selection module 104 can use any suitable number of luminance values for pixels of the image data. In some embodiments, the exposure selection module 104 determines that the image data is overexposed based on a single pixel of the image data having a luminance value greater than or equal to the threshold luminance value. In other embodiments, the exposure selection module 104 determines that the image data is overexposed based on multiple pixels of the image data having a luminance value greater than or equal to the threshold luminance value.

If the identified luminance is greater than or equal to a threshold luminance, the process 300 involves decreasing the selected exposure value, as depicted at block 308. For instance, prior to the image capture device 100 performing a capture operation in response to the capture command, the exposure selection module 104 configures the image capture device 100 to use a second exposure value that is less than the first exposure value described in the example above. The process returns to block 304 using the decreased exposure value.

Figure 5:
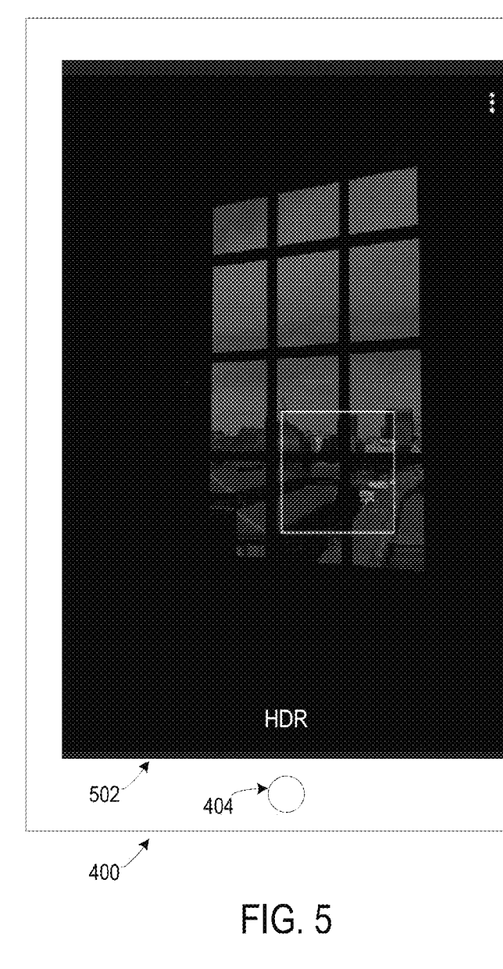
FIG. 5 depicts an example of the interface in FIG. 4 after with the exposure value reduced to a minimum exposure value for an HDR capture, according to certain embodiments of the present disclosure.

For instance, the image capture device 100 obtains a second set of image data using the second exposure value. FIG. 5 depicts an example of the interface 400 with the exposure value reduced to a minimum exposure value for an HDR capture, where the interface includes an updated preview 502 with lower luminance values in the preview image data. In some embodiments, obtaining this image data involves storing, in a volatile memory of the image capture device 100, the second set of image data. The second set of image data can be additional transient image data (e.g., a lower-resolution version of the raw image data 202 from the digital imaging sensor 108) or raw image data 202 (e.g., a selected frame from raw image data) sampled from the digital imaging sensor 108. This second set of image data is used at block 304.

Returning to FIG. 3, if the identified luminance is less than the threshold luminance, the process 300 involves configuring HDR setting of the image capture device to include a bracket of exposure values in which the selected exposure value is a minimum exposure value from the bracket of exposure values, as depicted at block 310. In some embodiments, an HDR setting includes one or more configuration parameters used by the image capture module 106 to capture a bracket of images for HDR processing. For instance, the HDR setting includes the bracket of exposure values determined by the exposure selection module 104. The exposure selection module 104 computes the bracket of exposure values that include the minimum exposure value (i.e., the exposure value that does not result in an overexposed pixel or set of pixels) as well as multiple exposure values that are greater than the minimum exposure value. The additional exposure values can be determined in any suitable manner.

In some embodiments, the exposure selection module 104 computes each additional exposure value by incrementing a previous exposure value by a specified step, starting with the minimum exposure value. In other embodiments, the exposure selection module 104 computes each additional exposure value by multiplying the minimum exposure value by a different scalar value.

In additional or alternative embodiments, the exposure selection module 104 determines a maximum exposure value by increasing the exposure value from the computed minimum exposure value until a threshold shutter speed has been reached or until the histogram indicates that shadows have been well exposed in the scene (whichever occurs first). The threshold shutter speed could correspond to a degree of acceptable motion in the imaged scene. The number and spacing between intermediate exposure values in the bracket (i.e., exposures between the minimum and maximum exposures) are determined based on one or more factors such as a desired signal-to-noise ratio, the capabilities of the imaging hardware, etc. In some cases, the intermediate exposure values can be spaced evenly, although non-uniform distribution of the intermediate exposure values could also be used.

In some embodiments, the bracket of exposure values includes a current exposure value, which could be the exposure value to which the image capture device 100 is set shortly before the capture command is received. For instance, the current exposure value could reflect a scene being well exposed for one or more objects of interest in the scene (e.g., an object that has been selected by a user tapping on the object as displayed in the preview interface). The current exposure value could therefore be included in the bracket of exposure values, either automatically or in response to some user input indicating to the exposure selection module 104 that the current exposure value is desirable (e.g., the user tap in the example provided above). In some cases, the current exposure value could be added to the bracket of exposure values after other intermediate exposure values are computed. In other cases, the current exposure value is used in combination with one or more of the minimum and maximum exposure values to compute other intermediate exposure values (e.g., by spacing other intermediate exposure values with respect to current exposure value).

The exposure selection module 104 provides the bracket of exposure values to the image capture module 106. For example, the exposure selection module 104 stores the bracket of exposure values in a suitable memory (e.g., a volatile memory, a non-volatile memory, or both) of the image capture device 100. The memory location is accessible by the image capture module 106 during image capture operations.

In some embodiments, the image capture device deletes, from a volatile memory, certain transient image data used to compute the bracket of exposure values after the bracket of exposure values has been computed. For instance, if frames of raw image data are stored in volatile memory to compute the bracket of exposure values, the processor 102 deletes these stored frames from the volatile memory prior to executing an HDR capture operation with the computed bracket of exposure values.

In some embodiments, the exposure adjustment operations described above involve iteratively comparing luminance values to the threshold luminance and decreasing the exposure value of the image capture device 100. For example, first image data could be obtained using a first exposure value in one iteration, where a first luminance for one or more pixels of the first image data is identified and compared to the threshold luminance. In a subsequent iteration, the exposure value could be decreased and second image data could be obtained using the decreased exposure value. A second luminance for one or more pixels of the second image data is identified and compared to the threshold luminance.

In additional or alternative embodiments, the exposure adjustment operations described above involve iteratively comparing luminance values to the threshold luminance and increasing the exposure value of the image capture device 100. For example, first image data could be obtained using a first exposure value in one iteration, where a first luminance for one or more pixels of the first image data is identified and compared to the threshold luminance. If an overexposure is not identified via the comparison, the exposure value could be increased. In a subsequent iteration, second image data could be obtained using the increased exposure value. A second luminance for one or more pixels of the second image data is identified and compared to the threshold luminance. If an overexposure is identified via the comparison, the exposure value is returned to the value from previous iteration in which no overexposure was identified. The previous exposure value is used as the minimum exposure value in the bracket of exposure values.

The process 300 further involves executing, responsive to the capture command, a capture operation using the HDR settings having the bracket of exposure values, as depicted at block 312. For instance, the image capture module 106 causes a processor 102 to access the stored bracket of exposure values generated at block 310. The image capture module 106 also causes the processing device to perform multiple image captures, each of which uses a different exposure value from the stored bracket of exposure values. The image capture module 106 also causes the processing device to combine the set of capture images into an HDR image.

In some embodiments, saturation of image sensor sites can be used to determine whether a threshold luminance value is exceeded. For instance, first image data in one iteration could include transient data derived from raw image data, and determining that a first luminance is greater than or equal to the threshold luminance involves determining, from the transient data, that one or more of image sensor sites are saturated. In another iteration, second image data includes additional transient data derived from raw image data, and determining that a first luminance is greater than or equal to the threshold luminance involves determining, from the transient data, that one or more of image sensor sites are saturated that the second luminance is less than the threshold luminance comprises determining, from the additional transient data, that none of the image sensor sites are saturated.

Figure 6:
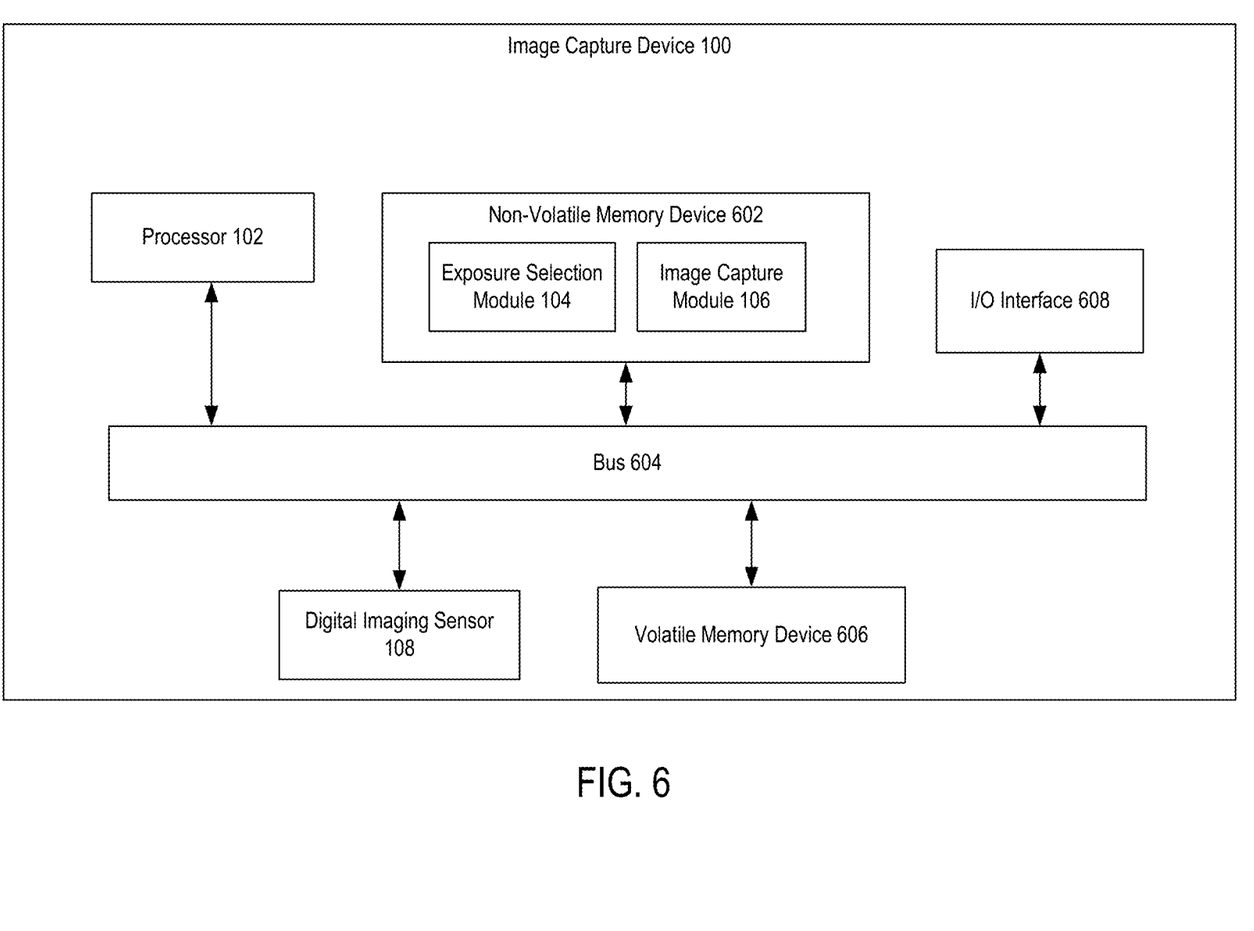
FIG. 6 depicts examples of devices included in the image capture device of FIG. 1, according to certain embodiments of the present disclosure.

Any suitable set of devices can be used for performing the operations described herein. For example, FIG. 6 depicts examples of devices included in the image capture device 100. The depicted examples of an image capture device 100 includes a processor 102 communicatively coupled to memory devices, which include one or more non-volatile memory devices 602 and one or more volatile memory devices 606. The processor 102 executes computer-executable program code stored in a memory device, accesses information stored in the memory devices, or both. Examples of the processor 102 include a microprocessor, a graphics processing unit, an application-specific integrated circuit ("ASIC"), a field-programmable gate array ("FPGA"), or any other suitable processing device. The processor 102 can include any number of processing devices, including a single processing device.

The memory devices include any suitable non-transitory computer-readable medium for storing data, program code, or both. A computer-readable medium can include any electronic, optical, magnetic, or other storage device capable of providing a processor with computer-readable instructions or other program code.

Non-limiting examples of the non-volatile memory device 602 include flash memory, a magnetic disk, a memory chip, a ROM, or any other medium from which a processing device can read instructions and that retains data in the absence of a power supply. The exposure selection module 104 and the image capture module 106 are stored as program instructions in the non-volatile memory device 602. The program instructions may include processor-specific instructions generated by a compiler or an interpreter from code written in any suitable computer-programming language, including, for example, C, C++, C #, Visual Basic, Java, Python, Perl, JavaScript, and ActionScript.

The volatile memory device 606 can be any memory device, such as random-access memory, that stores frequently used program instructions, transient data, or both for rapid access during processing operations. Transient image data, as described herein, can be stored in the volatile memory device 606 for use in the exposure adjustment operations described above with respect to FIG. 3.

The image capture device 100 may also include a number of external or internal devices, such as input or output devices. For example, the image capture device 100 is shown with one or more input/output ("I/O") interfaces 608.

An I/O interface 608 can receive input from input devices (e.g., a touchscreen, a button, a mouse, etc.) or provide output to output devices (e.g., a display device that provides visual sensory output). One or more buses 604 are also included in the image capture device 100. The bus 604 communicatively couples one or more components of the image capture device 100, as depicted by the bidirectional arrows in FIG. 6.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for automatically configuring an image capture device with a set of exposure values used for high dynamic range ("HDR") imaging, wherein the method is performed by one or more processing devices and includes operations comprising:

receiving, at the image capture device, user input specifying a capture command indicating that a scene depicted in a preview interface of the image capture device should be captured as an image;

performing exposure adjustment operations subsequent to receiving the user input specifying the capture command, the exposure adjustment operations comprising:

determining, from first image data, a first luminance indicated by the first image data is greater than or equal to a threshold luminance, wherein the first image data is obtained using the image capture device configured with a first exposure value, wherein:

(a) the first image data comprises first transient data that is derived from first raw image data and that depicts the scene in the preview interface on a screen of the image capture device, the first raw image data generated by a digital imaging sensor of the image capture device capturing the scene, the first transient data having a lower resolution than the first raw image data, and (b) determining that the first luminance is greater than or equal to the threshold luminance comprises determining, from the first transient data, that one or more image sensor sites are saturated, wherein the one or more image sensor sites being saturated comprises a luminance detected at the one or more image sensor sites being a maximum luminance detectable by the one or more image sensor sites;

decreasing, based on the first luminance exceeding the threshold luminance, the first exposure value of the image capture device to a second exposure value;

determining, from second image data, that a second luminance indicated by the second image data is less than the threshold luminance, wherein the second image data is obtained using the image capture device configured with the second exposure value, wherein:

(a) the second image data comprises second transient data that is derived from second raw image data and that depicts the scene in the preview interface on the screen, the second raw image data generated by the digital imaging sensor capturing the scene, the second transient data having a lower resolution than the second raw image data, and (b) determining that the second luminance is less than the threshold luminance comprises determining, from the second transient data, that none of the image sensor sites are saturated;

configuring an HDR setting of the image capture device to include a bracket of exposure values in which the second exposure value is a minimum exposure value from the bracket of exposure values; and executing, by the image capture device and responsive to the capture command, a capture operation using the HDR setting having the bracket of exposure values.

2. The method of claim 1, wherein the exposure adjustment operations further comprise:
accessing raw image data generated by the digital imaging sensor of the image capture device;
selecting a first frame of the raw image data as the first raw image data, wherein the first luminance is a luminance value of one or more pixels in the first transient data of the first frame; and
selecting a second frame of the raw image data as the second raw image data, wherein the second luminance is a luminance value of one or more pixels in the second transient data of the second frame.

3. The method of claim 2, further comprising:
deleting the first frame and the second frame from a volatile memory of the image capture device,
wherein executing the capture operation is performed subsequent to said deleting and comprises accessing additional frames from the raw image data in the volatile memory, converting the accessed additional frames to a compressed image format, and storing, in a non-volatile memory of the image capture device, the image as generated from compressed frames generated by converting the accessed additional frames to the compressed image format.

4. The method of claim 1, wherein the exposure adjustment operations further comprise iteratively comparing luminance values to the threshold luminance and decreasing an exposure value of the image capture device, wherein the first luminance is identified and compared to the threshold luminance in a first iteration, wherein the second luminance is identified and compared to the threshold luminance in a second iteration subsequent to the first iteration.

5. The method of claim 1, wherein the exposure adjustment operations further comprise iteratively comparing luminance values to the threshold luminance and increasing an exposure value of the image capture device, wherein the first luminance is identified and compared to the threshold luminance in a first iteration, wherein the second luminance is identified and compared to the threshold luminance in a second iteration prior to the first iteration.

6. The method of claim 1, wherein the exposure adjustment operations are completed prior to executing the capture operation at the image capture device.

7. A system comprising:
a processing device; and
a non-transitory computer-readable medium communicatively coupled to the processing device, wherein the processing device is configured to execute an image editing application stored in the non-transitory computer-readable medium and thereby perform operations for configuring an image capture device with a set of exposure values used for high dynamic range ("HDR") imaging, the operations comprising:
performing exposure adjustment operations that comprise:
determining, from first image data, a first luminance indicated by the first image data is greater than or equal to a threshold luminance, wherein the first image data is obtained using the image capture device configured with a first exposure value, wherein:
(a) the first image data comprises first transient data that is derived from first raw image data, the first raw image data generated by a digital imaging sensor of the image capture device, the first transient data having a lower resolution than the first raw image data, and
(b) determining that the first luminance is greater than or equal to the threshold luminance comprises determining, from the first transient data, that one or more image sensor sites are saturated, wherein the one or more image sensor sites being saturated comprises a luminance detected at the one or more image sensor sites being a maximum luminance detectable by the one or more image sensor sites,
decreasing, based on the first luminance exceeding the threshold luminance, the first exposure value of the image capture device to a second exposure value,
determining, from second image data, that a second luminance indicated by the second image data is less than the threshold luminance, wherein the second image data is obtained using the image capture device configured with the second exposure value, wherein:
(a) the second image data comprises second transient data derived from second raw image data, the second raw image data generated by the digital imaging sensor, the second transient data having a lower resolution than the second raw image data, and
(b) determining that the second luminance is less than the threshold luminance comprises determining, from the second transient data, that none of the image sensor sites are saturated, and
configuring an HDR setting of the image capture device to include a bracket of exposure values in which the second exposure value is a minimum exposure value from the bracket of exposure values.

8. The system of claim 7, wherein the exposure adjustment operations further comprise:
accessing raw image data generated by the digital imaging sensor of the image capture device;
selecting a first frame of the raw image data as the first raw image data, wherein the first luminance is a luminance value of one or more pixels in the first transient data of the first frame; and
selecting a second frame of the raw image data as the second raw image data, wherein the second luminance is a luminance value of one or more pixels in the second transient data of the second frame.

9. The system of claim 8, the operations further comprising:
receiving, at the image capture device, a capture command to capture an image;
performing the exposure adjustment operations subsequent to receiving the capture command;
deleting the first frame and the second frame from a volatile memory of the image capture device; and
executing, by the image capture device and responsive to the capture command, a capture operation using the HDR setting having the bracket of exposure values, wherein executing the capture operation is performed subsequent to said deleting and comprises accessing additional frames from the raw image data in the volatile memory, converting the accessed additional frames to a compressed image format, and storing, in a non-volatile memory of the image capture device, the image as generated from compressed frames generated by converting the accessed additional frames to the compressed image format.

10. The system of claim 7, wherein the exposure adjustment operations further comprise iteratively comparing luminance values to the threshold luminance and decreasing an exposure value of the image capture device, wherein the first luminance is identified and compared to the threshold luminance in a first iteration, wherein the second luminance is identified and compared to the threshold luminance in a second iteration subsequent to the first iteration.

11. The system of claim 7, wherein the exposure adjustment operations further comprise iteratively comparing luminance values to the threshold luminance and increasing an exposure value of the image capture device, wherein the first luminance is identified and compared to the threshold luminance in a first iteration, wherein the second luminance is identified and compared to the threshold luminance in a second iteration prior to the first iteration.

12. The system of claim 7, the operations further comprising:
receiving, prior to the exposure adjustment operations, a capture command; and
executing, by the image capture device and responsive to the capture command, a capture operation using the HDR setting having the bracket of exposure values, wherein the system is configured for completing the exposure adjustment operations prior to executing the capture operation.

13. A non-transitory computer-readable medium having program code that is stored thereon and that is executable by a processing device for performing operations that configure an image capture device with a set of exposure values used for high dynamic range ("HDR") imaging, the operations comprising:
receiving, at the image capture device, user input specifying a capture command indicating that a scene depicted in a preview interface of the image capture device should be captured as an image;
performing exposure adjustment operations subsequent to receiving the user input specifying the capture command, the exposure adjustment operations comprising:
obtaining first raw image data from a digital imaging sensor of the image capture device, wherein the first raw image data is obtained using the image capture device configured with a first exposure value,
deriving, from the first raw image data, first transient data that depicts the scene in the preview interface on a screen of the image capture device,
determining that a first luminance indicated by the first transient data is greater than or equal to a threshold luminance by at least determining, from the first transient data, that one or more image sensor sites are saturated,
decreasing, based on the first luminance exceeding the threshold luminance, the first exposure value of the image capture device to a second exposure value,
obtaining second raw image data from the digital imaging sensor of the image capture device, wherein the second raw image data is obtained using the image capture device configured with the second exposure value,
deriving, from the second raw image data, second transient data that depicts the scene in the preview interface on the screen of the image capture device, and
determining that a second luminance indicated by the second transient data is less than the threshold luminance by at least determining, from the second transient data, that none of the image sensor sites are saturated,
configuring an HDR setting of the image capture device to include a bracket of exposure values in which the second exposure value is a minimum exposure value from the bracket of exposure values;
executing, by the image capture device and responsive to the capture command, a capture operation using the HDR setting having the bracket of exposure values.

14. The non-transitory computer-readable medium of claim 13, wherein the exposure adjustment operations further comprise:
accessing raw image data generated by the digital imaging sensor of the image capture device;
selecting a first frame of the raw image data as the first raw image data, wherein the first luminance is a luminance value of one or more pixels in the first transient data of the first frame; and
selecting a second frame of the raw image data as the second raw image data, wherein the second luminance is a luminance value of one or more pixels in the second transient data of the second frame.

15. The non-transitory computer-readable medium of claim 14, the operations further comprising:
deleting the first frame and the second frame from a volatile memory of the image capture device,
wherein executing the capture operation is performed subsequent to said deleting and comprises accessing additional frames from the raw image data in the volatile memory, converting the accessed additional frames to a compressed image format, and storing, in a non-volatile memory of the image capture device, the image as generated from compressed frames generated by converting the accessed additional frames to the compressed image format.

16. The non-transitory computer-readable medium of claim 13, wherein the exposure adjustment operations further comprise iteratively comparing luminance values to the threshold luminance and decreasing an exposure value of the image capture device, wherein the first luminance is identified and compared to the threshold luminance in a first iteration, wherein the second luminance is identified and compared to the threshold luminance in a second iteration subsequent to the first iteration.

17. The non-transitory computer-readable medium of claim 13, wherein the exposure adjustment operations further comprise iteratively comparing luminance values to the threshold luminance and increasing an exposure value of the image capture device, wherein the first luminance is identified and compared to the threshold luminance in a first iteration, wherein the second luminance is identified and compared to the threshold luminance in a second iteration prior to the first iteration.

18. The system of claim 7, wherein:
the digital imaging sensor of the image capture device capturing a scene is configured for generating the first raw image data and the second raw image data,
the first transient data that is derived from the first raw image data depicts the scene in a preview interface on a screen of the image capture device, and
the second transient data that is derived from the second raw image data depicts the scene in the preview interface on the screen of the image capture device.

* * * * *